United States Patent
Liang et al.

(10) Patent No.: US 8,352,943 B2
(45) Date of Patent: Jan. 8, 2013

(54) METHOD FOR PREVENTING INDUSTRIAL AUTOMATION SYSTEM FROM AVALANCHE

(75) Inventors: Jun Liang, Shanghai (CN); Yuan Lin, Shanghai (CN)

(73) Assignee: Shanghai Kelu Software Co., Ltd., Zhangjiang Hi-Tech Park, Shanghai (CN)

( * ) Notice: Subject to any disclaimer, the term of this patent is extended or adjusted under 35 U.S.C. 154(b) by 331 days.

(21) Appl. No.: 12/741,446

(22) PCT Filed: Sep. 28, 2008

(86) PCT No.: PCT/CN2008/001673
§ 371 (c)(1),
(2), (4) Date: May 5, 2010

(87) PCT Pub. No.: WO2009/062372
PCT Pub. Date: May 22, 2009

(65) Prior Publication Data
US 2010/0257532 A1    Oct. 7, 2010

(30) Foreign Application Priority Data
Nov. 9, 2007  (CN) .......................... 2007 1 0048066

(51) Int. Cl.
G06F 9/46   (2006.01)
G06F 15/173 (2006.01)

(52) U.S. Cl. ........ 718/100; 718/102; 718/103; 718/104; 718/106; 718/108; 709/223; 709/224; 709/226

(58) Field of Classification Search .................. 718/100, 718/102, 103, 104, 108
See application file for complete search history.

(56) References Cited

U.S. PATENT DOCUMENTS

| | | | | |
|---|---|---|---|---|
| 5,943,687 A | * | 8/1999 | Liedberg | 711/156 |
| 6,996,822 B1 | * | 2/2006 | Willen et al. | 718/102 |
| 2003/0033345 A1 | * | 2/2003 | Keefer et al. | 709/102 |
| 2003/0172104 A1 | * | 9/2003 | Hooman et al. | 709/103 |
| 2004/0039884 A1 | * | 2/2004 | Li | 711/156 |
| 2004/0054999 A1 | * | 3/2004 | Willen et al. | 718/103 |

(Continued)

FOREIGN PATENT DOCUMENTS

| | | |
|---|---|---|
| CN | 1255986 A | 6/2000 |
| CN | 1858720 A | 11/2006 |

*Primary Examiner* — Emerson Puente
*Assistant Examiner* — Charles Swift
(74) *Attorney, Agent, or Firm* — Global IP Services; Tianhua Gu

(57) ABSTRACT

The invention relates to a method for preventing industrial automation system from avalanche, in which the industrial automation system comprising a storage unit for storing time stream data to be processed and a CPU for processing the time stream data in the storage unit, the method comprises the following items: 1) establishing a data processing task priority level; 2) scheduling the data processing task of the CPU; 3) using method of the storage unit. Under a given CPU processing ability, the time stream data to be processed is set with different priority levels, the CPU firstly processes the to-be-processed data processing task with the highest priority level and then processes those with the next priority level. And the storage unit is also set with the corresponding sub-storage units with different priority levels in accordance with the priority levels of the to-be-processed data processing task. The to-be-processed data processing task with higher priority level can be stored or cover those with lower priority level. Therefore, it can effectively ensure that the automation system deals with unexpected number of tasks without causing the crash of the system under a given CPU processing ability.

6 Claims, 1 Drawing Sheet

U.S. PATENT DOCUMENTS

| | | | | |
|---|---|---|---|---|
| 2004/0158831 A1* | 8/2004 | Amano et al. | | 718/100 |
| 2006/0130062 A1* | 6/2006 | Burdick et al. | | 718/100 |
| 2006/0242275 A1* | 10/2006 | Shapiro | | 709/220 |
| 2007/0061788 A1* | 3/2007 | Dodge et al. | | 717/140 |
| 2007/0294702 A1* | 12/2007 | Melvin et al. | | 718/104 |
| 2008/0098395 A1* | 4/2008 | Backer | | 718/102 |
| 2008/0222640 A1* | 9/2008 | Daly et al. | | 718/103 |
| 2008/0235701 A1* | 9/2008 | Danko | | 718/104 |
| 2009/0031317 A1* | 1/2009 | Gopalan et al. | | 718/103 |
| 2009/0031318 A1* | 1/2009 | Gopalan et al. | | 718/103 |

* cited by examiner

METHOD FOR PREVENTING INDUSTRIAL AUTOMATION SYSTEM FROM AVALANCHE

CROSS REFERENCE TO RELATED PATENT APPLICATION

The present application is US national stage of PCT/CN2008/001673 filed on Sep. 28, 2008, which claims the priority of the Chinese patent application No. 200710048066.8 filed on Nov. 9, 2007, which application is incorporated herein by reference.

FIELD OF THE INVENTION

The present invention relates to a method for preventing industrial automation system from avalanche.

DESCRIPTION OF THE PRIOR ART

With the widely use of the automation system in the industrial fields and the increasingly large scale of the automation system, higher demands on the processing ability of the core processing equipment of the automation system are put forward. Such as integrated automation system of the large enterprise, automatic dispatching system of the national railway, automatic dispatching system of the national power grid, the air traffic control system, the urban traffic control system, the automated command system, the national economic management system and so on. The security and stability of the automation system in the whole production, management and life have become critical and highly concerned problems.

Nowadays, the automation system generally adopts the multi-process and multi-task scheduling mechanism. Each process (task) has a separate storage unit (buffer). Since different processes cannot share the storage units (buffer), the system is unable to control storage units. For larger systems, because there are too many tasks to process, which takes up too much resource, and the processing ability of the relative CPU is limited, the tasks cannot be processed in time. Especially when an unexpected event occurs to an application (e.g. a failure), the application will have a large number of data changes and the amount of communication between the storage unit and the CPU increases sharply, which causes a large number of data processing tasks to be processed. Meanwhile, the data processing tasks to be processed take over or wait for resources with each other, which make the operating system present the false crash or crash state. This is the so-called avalanche phenomenon. The frequent false crash or crash of the system seriously affects the normal and stable operation of the automation system and a big security risk exists.

When a failure occurs to an important process related to the automation task and other non-related processes keep running, the watchdog setup cannot correctly judge whether the system has the failure. Therefore, it cannot restart automatically in time and the watchdog failure appears. The failure of the watchdog is the main problem that the automatic recovery capability required by the unattended automation system needs to be resolved.

The benefit of the multi-process and multi-task scheduling mechanism is that it can simultaneously handle the automatic essential tasks, non-essential tasks and other unrelated tasks. However, since the multiple tasks are processed at the same time and cannot be prioritized in the task scheduling mechanism, it will probably result in the delay of important tasks.. Although the improvement has been made in the aspects of the process handling and priority scheduling of some systems, in the case that there are lots of high-priority tasks and the resources are depleted, the phenomenon of the false crash or crash of the system will occur and the failure of the watchdog still cannot be effectively resolved.

The data to be processed in the industrial automation system is generally the time stream data that is based on the time series. For example, a certain category of the monitoring data of the same monitored equipment is in turn transmitted to the CPU of the operating system for processing in accordance with the time sequence. With the consideration of the special requirement in dealing with such time stream data, the industrial automation system proposes special demands on its core equipment system architecture and task scheduling mechanism. That is, to fully use the limited capacity of the CPU, to achieve the high integration of the automation system (communications, automation application, Web Server, and etc.), and to deal with the automatic task to a largest extent, especially dealing with the most important tasks, and to ensure the false crash or crash will not occur to the automation system.

SUMMARY OF THE INVENTION

It is an object of the present invention to provide a method for preventing industrial automation system from avalanche, which will be able to increase the operating efficiency of the automation system. Under the method of the present invention, the phenomenon of false crash or crash will not occur even if the system is under the extreme situation.

Another object of the present invention is to provide a method for preventing industrial automation system from avalanche, which will enable the system to automatically resume the operation when the failure occurs through setting a watchdog.

For achieving above stated objects, the method for preventing industrial automation system from avalanche, in which the industrial automation system comprises a storage unit for storing time stream data to be processed and a CPU for processing the time stream data in the storage unit, the method comprises the following items:

1) establishing a data processing task priority level, that is, establishing a process and multiple threads to deal with the process for the time stream data to be processed, setting the storage unit as an independent storage unit for the process, setting the time stream data to be processed as the to-be-processed data processing tasks in different priority levels according to type of the time stream data to be processed and dividing the said storage unit into corresponding sub-storage units with different priorities;

2) scheduling the data processing tasks of the CPU, that is, the CPU uses its full processing ability to deal with the to-be-processed data processing task with current highest priority level, only after the to-be-processed data processing task with the current highest priority level is finished, the CPU shall process the to-be-processed data processing task with lower priority level in sequence; If a newly received to-be-processed data processing task has a higher priority level than that the CPU is processing, the CPU shall stop the current task and switch to deal with the newly received to-be-processed data processing task with higher priority level;

3) using method of the storage unit:

storing the to-be-processed data processing task that the CPU cannot process in time, or the delayed to-be-processed data processing task that the CPU stops dealing with, respectively in corresponding sub-storage units according priority level thereof;

when a certain sub-storage unit is full-filled with the to-be-processed data processing tasks, newly received to-be-processed data processing task that should be stored in said certain sub-storage unit shall be stored in one of the other sub-storage units with more lower priority level than that of said certain sub-storage unit;

if the other sub-storage units with more lower priority level than said certain sub-storage unit are full-filled too, newly received to-be-processed data processing task that should be stored in said certain sub-storage unit shall be stored in one of said other sub-storage units with more lower priority level by covering one of the stored to-be-processed data processing tasks which has lower priority level than that of the newly received to-be-processed data processing task;

moreover, when the newly received to-be-processed data processing task is being stored or covering, it is preferable to store the newly received to-be-processed data processing task in sub-storage unites with more lower priority level;

if all the sub-storage units are full-filled and newly received to-be-processed data processing task has a same priority level as one of the to-be-processed data processing tasks stored in the sub-storage unit with the lowest priority level, the newly received to-be-processed data processing task shall be stored in the sub-storage unit with the lowest priority level by covering the former stored to-be-processed data processing task with the same priority level; If the newly received to-be-processed data processing task has lower priority level than all the to-be-processed data processing tasks in the sub-storage unit with the lowest priority level, the newly received to-be-processed data processing task shall be automatically deleted without being processed.

As a preference, in the above said item 2) Scheduling the data processing task of the CPU, when the CPU stops processing the current task, the CPU shall store the currently processed data into the sub-storage unit with the corresponding priority level of the said storage unit and switches to the newly received to-be-processed data processing task, and it is in random when the CPU selects one of the to-be-processed data processing tasks with the same priority level from the storage unit.

Generally, the probability of the occurrence is low when it occurs to the above stated situation caused by as much as the data with the high priority. Even if such overload of the demand of the resource occupation occurs at a certain time, it can ensure that the system will not crash under the said method. It is because that, compared with ignoring part of task, the crash has greater impact on the system. As for hackers and virus attacks and the unauthorized access, even if they break through various safety precautions of the system, as the priority level is set in advance, while the priority level of these tasks is the lowest, these tasks will be covered or deleted directly.

In addition, a thread used for managing the hardware watchdog is set in the said process, when one of the threads used for processing the said process fails, the said process shall stop working, then the thread which is responsible for managing the hardware watchdog shall stop working and the system shall restart. Accordingly, the self-recovery ability required by the automation system will be achieved when no one attends.

Compared with the prior art, in this present invention, the time stream data to be processed is set with different priority levels. Under a given CPU processing ability, the CPU firstly processes the to-be-processed data processing task with the highest priority level and then processes those with the next priority level. And the storage unit is also set with the corresponding sub-storage units with different priority levels in accordance with the priority levels of the to-be-processed data processing task. The to-be-processed data processing task with higher priority level can be stored or cover those with lower priority level. Therefore, it can effectively ensure that the automation system deals with unexpected number of tasks without causing the false crash or crash of the system under a given CPU processing ability. Meanwhile, as for the data with virus or hacker attacks or other external access, because it has the lowest priority level, it will be covered or deleted directly by the system, which effectively ensure the security and stability of the system. Furthermore, the single-process multi-thread task scheduling mechanism can effectively solve the problem of the failure of the watchdog, and can achieve the self-recovery ability needed by the automation system when no one attends.

DETAILED DESCRIPTION OF THE PREFERRED EMBODIMENT

Figure 1:
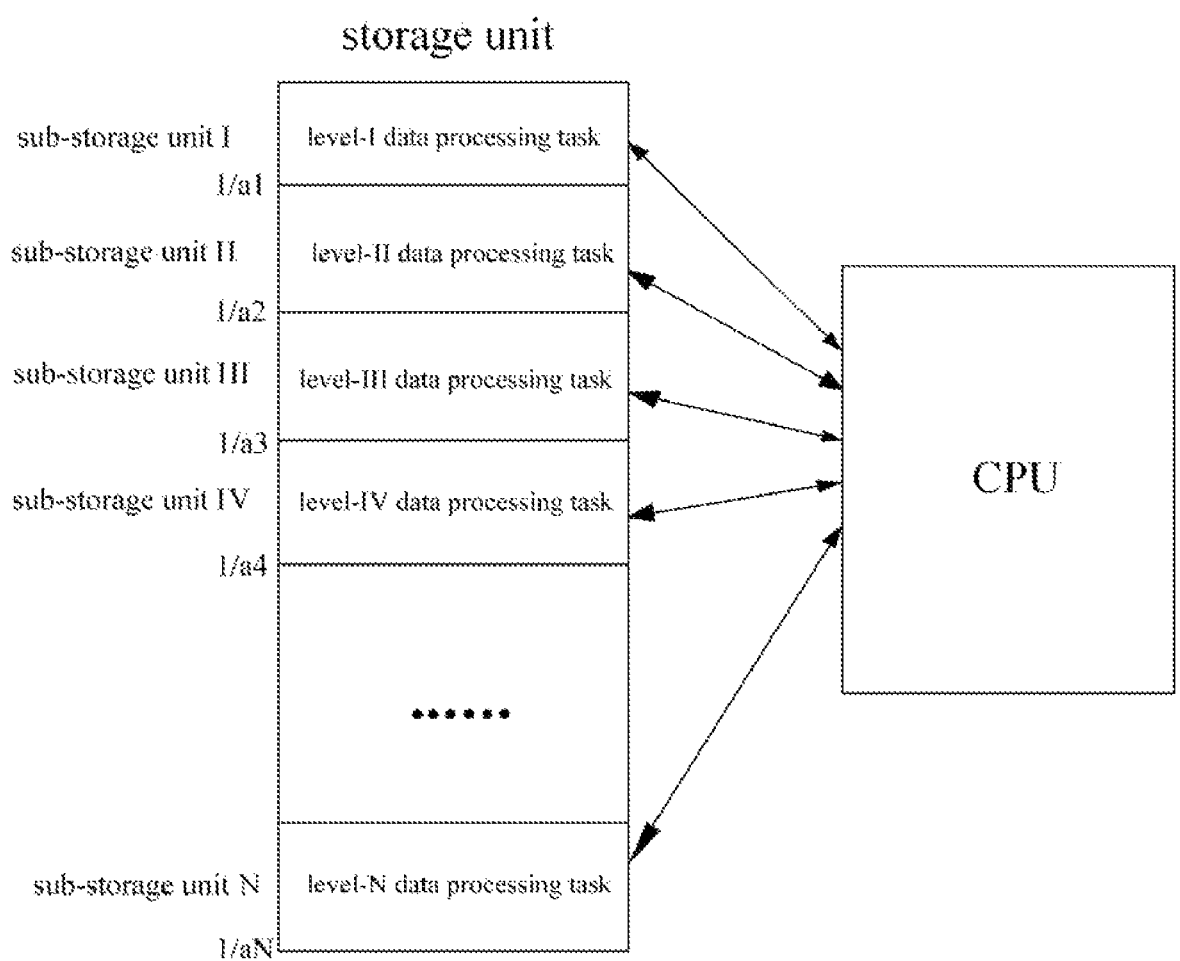
FIG. 1 is an illustration of the industrial automation system of the embodiment of the present invention.

To enable a further understanding of the innovative and technological content of the invention herein, refer to the detailed description of the invention and the accompanying drawings below:

As shown in FIG. 1, the industrial automation system provided by the embodiment of the present invention comprises a storage unit for storing the time stream data to be processed and a CPU for processing the time stream data in the storage unit. The method for preventing industrial automation system from avalanche of the present invention is as below:

Firstly, establishing a process and multiple threads to deal with the process for all the time stream data to be processed, all the time stream data to be processed are classified into a level-I data processing task, a level-II data processing task, a level-III data processing task, a level-IV data processing task . . . and a level-N data processing task from the higher priority level to the lower priority level in accordance with the type and importance degree of the time stream data to be processed.

While the storage unit is divided into a sub-storage unit I, a sub-storage unit II, a sub-storage unit III, a sub-storage unit IV . . . and a sub-storage unit N from the higher priority level to the lower priority level, and the sub-storage unit I, the sub-storage unit II, the sub-storage unit III, the sub-storage unit IV . . . and the sub-storage unit N respectively occupy the $1/a1$, $1/a2$, $1/a3$, $1/a4$ ••••••$1/aN$ of the entire space of the storage unit, and $1/a1+1/a2+1/a3+1/a4+$••••••$1/aN=1$.

These data processing tasks in different priority levels are respectively and correspondingly stored in the sub-storage unit I, the sub-storage unit II, the sub-storage unit III, the sub-storage unit IV . . . and the sub-storage unit N in the storage unit.

Once the storage unit receives the new level-I data processing task, the CPU will process the new received level-I data processing task with full processing capacity, after finishing processing, the CPU will process the level-II data processing task or the data processing task with lower priority level than that of the level-II data processing task. When the occupation of the CPU has reached 100% and the level-I data processing task is still not processed, the level-I data processing task to be processed will be stored in corresponding sub-storage unit I. While the newly received level-II data processing task, level-III data processing task, level-IV data processing task . . . and level-N data processing task are respectively stored in the sub-storage unit II, the sub-storage unit III, the sub-storage unit IV . . . and the sub-storage unit N. When the occupation of the CPU has reached 100% and the sub-storage unit I is also full-filled, the level-I data processing task to be processed will be stored in the sub-storage unit N; If the sub-storage unit N is full-filled, the level-I data processing task to be processed shall cover the data processing tasks in the sub-storage unit N with lower priority lever than that of the level-I data processing task; If the sub-storage unit N is full-filled with the level-I data processing task, the newly received level-I data processing task shall be stored in the sub-storage unit N-1. By analogy, until all the sub-storage units are full-filled with the level-I data processing tasks. If all the sub-storage units are full-filled with the level-I data processing tasks, the newly received level-I data processing task shall cover the task with the longest storage time in the storage unit.

When the CPU has margin processing capacity, the CPU will select the data processing task randomly from the same sub-storage unit of the sub-storage unit I, the sub-storage unit II, the sub-storage unit III, the sub-storage unit IV . . . and the sub-storage unit N in succession, and deal with equally.

Similarly, when the storage unit receives the new level-II data processing task, the new level-II data processing task will be stored in the sub-storage unit II and wait be processed by the CPU. When the occupation of the CPU has reached 100% and the sub-storage unit II is also full-filled, the level-II data processing task will be stored in the sub-storage unit N; If the sub-storage unit N is full-filled, the new level-II data processing task shall cover the data processing tasks in the sub-storage unit N with lower priority lever than that of the level-II data processing task; If the sub-storage unit N is full-filled with the level-I data processing tasks or the level-II data processing tasks, the newly received level-II data processing task shall be stored in the sub-storage unit N-1. By analogy, until all the sub-storage units are full-filled with the level-I data processing tasks or the level-II data processing tasks. If the sub-storage unit I, the sub-storage unit II, the sub-storage unit III, the sub-storage unit IV . . . and the sub-storage unit N are all full-filled with the level-I data processing tasks or the level-II data processing tasks, the newly received level-II data processing task shall cover the level-II data processing task with the longest storage time in the storage unit.

By analogy, the level-III data processing task, the level-IV data processing task . . . and the level-N data processing task are respectively stored in the storage unit in the same method as the level-II data processing task.

When the entire storage unit is full-filled, if the priority level of the newly received data processing task is lower than that of the level-N data processing task, the newly received data processing task shall be deleted directly.

A thread of watchdog for managing the hardware is configured in the said progress. When one of the said multiple threads used for processing the progress fails, the said process shall stop working, then the thread which is responsible for managing the hardware watchdog shall stop working and the system shall restart. Accordingly, the self-recovery ability required by the automation system will be achieved when no one attends.

What is claimed is:

1. A method for preventing industrial automation system from avalanche, in which the industrial automation system comprising a storage unit for storing time stream data to be processed and a CPU for processing the time stream data in the storage unit, the method comprising the following items:
1) establishing a data processing task priority level, that is, establishing a process and multiple threads to deal with the process for the time stream data to be processed, setting the storage unit as an independent storage unit for the process, setting the time stream data to be processed as the to-be-processed data processing tasks in different priority levels according to type of the time stream data to be processed and dividing the said storage unit into corresponding sub-storage units with different priorities;
2) scheduling the data processing tasks of the CPU, that is, the CPU uses its full processing ability to deal with the to-be-processed data processing task with current highest priority level, only after the to-be-processed data processing task with the current highest priority level is finished, the CPU shall process the to-be-processed data processing task with lower priority level in sequence; if a newly received to-be-processed data processing task has a higher priority level than that the CPU is processing, the CPU shall stop the current task and switch to deal with the newly received to-be-processed data processing task with higher priority level;
3) using method of the storage unit:
storing the to-be-processed data processing task that the CPU cannot process in time, or the delayed to-be-processed data processing task that the CPU stops dealing with, respectively in corresponding sub-storage units according priority level thereof;
when a certain sub-storage unit is full-filled with the to-be-processed data processing tasks, newly received to-be-processed data processing task that should be stored in said certain sub-storage unit shall be stored in one of the other sub-storage units with more lower priority level than that of said certain sub-storage unit;
if the other sub-storage units with more lower priority level than said certain sub-storage unit are full-filled too, newly received to-be-processed data processing task that should be stored in said certain sub-storage unit shall be stored in one of said other sub-storage units with more lower priority level by covering one of the stored to-be-processed data processing tasks which has lower priority level than that of the newly received to-be-processed data processing task;
if all the sub-storage units are full-filled and newly received to-be-processed data processing task has a same priority level as one of the to-be-processed data processing tasks stored in the sub-storage unit with the lowest priority level, the newly received to-be-processed data processing task shall be stored in the sub-storage unit with the lowest priority level by covering the former stored to-be-processed data processing task with the same priority level; if the newly received to-be-processed data processing task has lower priority level than all the to-be-processed data processing tasks in the sub-storage unit with the lowest priority level, the newly received to-be-processed data processing task shall be automatically deleted without being processed.

2. The method for preventing industrial automation system from avalanche of claim 1, wherein in the said item 2) scheduling the data processing task of the CPU, when the CPU stops processing the current task, the CPU shall store the currently processed data into the sub-storage unit with the corresponding priority level of the said storage unit and switches to the newly received to-be-processed data processing task, and it is in random the CPU selects one of the to-be-processed data processing tasks with the same priority level from the storage unit.

3. The method for preventing industrial automation system from avalanche of claim 1, wherein in the said using method item 3) of the storage unit, when the newly received to-be-processed data processing task is being stored in the substorage unit which has lower priority level than the substorage unit should be stored in, it is preferable to store the newly received to-be-processed data processing task in sub-storage units with more lower priority level.

4. The method for preventing industrial automation system from avalanche of claim 1, wherein a thread used for managing the hardware watchdog is set in the said process, when one of the threads used for processing the said process fails, the said process shall stop working, then the thread which is responsible for managing the hardware watchdog shall stop working and the system shall restart.

5. The method for preventing industrial automation system from avalanche of claim 2, wherein a thread used for managing the hardware watchdog is set in the said process, when one of the threads used for processing the said process fails, the said process shall stop working, then the thread which is responsible for managing the hardware watchdog shall stop working and the system shall restart.

6. The method for preventing industrial automation system from avalanche of claim 3, wherein a thread used for managing the hardware watchdog is set in the said process, when one of the threads used for processing the said process fails, the said process shall stop working, then the thread which is responsible for managing the hardware watchdog shall stop working and the system shall restart.

\* \* \* \* \*